United States Patent

[11] 3,633,283

[72] Inventors: Abraham Rudolph Mishkin; William Stephen Symbolik, both of Marysville, Ohio
[21] Appl. No.: 5,999
[22] Filed: Jan. 6, 1970
[45] Patented: Jan. 11, 1972
[73] Assignee: Societe D'Assistance Technique Pour Porduits Nestle S. A. Lausanne, Switzerland
[32] Priorities: July 6, 1967
[33] Switzerland
[31] 9569/67; Oct. 9, 1967, Switzerland, No. 14068/67 Original application June 28, 1968, Ser. No. 741,039. Divided and this application Jan. 6, 1970, Ser. No. 5,999

[54] DRYING APPARATUS
4 Claims, 2 Drawing Figs.

[52] U.S. Cl.................................................... 34/73, 34/5, 34/92

[51] Int. Cl..................................................... F26b 21/06
[50] Field of Search............................................. 34/5, 73, 92

[56] References Cited
UNITED STATES PATENTS
1,104,920   7/1914   Osborne.................... 34/5 UX
3,431,655   3/1969   Grover et al................ 34/5

Primary Examiner—Carroll B. Dority, Jr.
Attorney—Watson, Leavenworth & Kelton

ABSTRACT: Drying of liquids is disclosed in which the liquid is sprayed, together with a gaseous fluid such as steams, into a low-pressure zone to cause freezing of the liquid in small particle form, and the frozen particles are then freeze-dried. The liquid may be a biological solution, fruit juice or tea or coffee extract. Apparatus for effecting such drying comprises a freezing chamber, a two fluid nozzle simultaneously spraying liquid and gas into the chamber, a vacuum system with condensers for maintaining a low pressure within the chamber and a freeze-drying chamber.

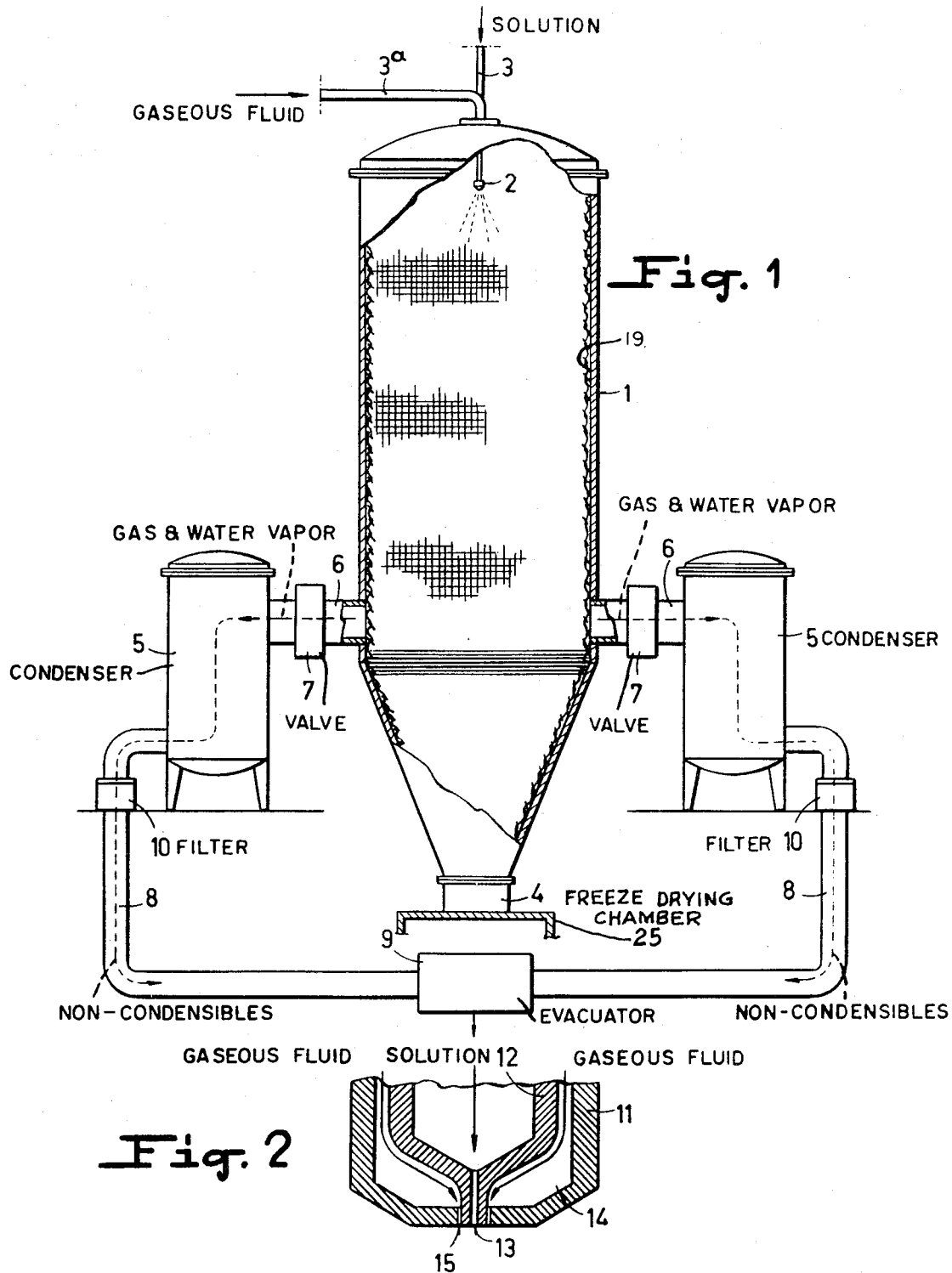

DRYING APPARATUS

This is a Division of application Ser. No. 741,039 filed June 28, 1968.

The present invention is concerned with apparatus for the drying of various materials in solution or suspension in a liquid, notably extracts of different types, fruit juices, milk products and the like.

There exist processes for drying by spray-freezing, in which the liquid to be dried is sprayed in the form of fine droplets into a partially evacuated chamber in which the pressure may for example be of the order of 100 to 500 microns of mercury. On entering the low-pressure zone, the fine particles freeze during their fall and should normally be in solid state by the time they come into contact with a wall of the chamber. The frozen particles are then dried by subliming the liquid diluent in a suitable freeze-drying chamber.

In practice, operation of the process described above has certain disadvantages which have considerably restricted its industrial application. Thus, the formation of fine particles involves an atomization of the liquid under high pressure. The particles are formed in a stream which originally moves at high speed and since its path lies in a vacuum, there is no resistance to their falling motion within the chamber. As a consequence it frequently happens that the liquid particles hit one of the walls of the chamber before they have been frozen to a solid state and thus stick to the wall, which leads to losses in production. To overcome this particular problem, attempts have been made to lengthen the trajectory of the particles, as by increasing the height of the chamber or by spraying the liquid upwards rather than downwards. Neither of these improvements has proved to be entirely satisfactory for efficient industrial operation since dry products could only be obtained from dilute solutions generally not containing more than about 20 percent by weight of solids.

Problems of a different nature had also arisen in that the rapid cooling of the liquid on entering the vacuum caused it to freeze and frequently plug the nozzle through which it was sprayed.

An object of the present invention is to provide apparatus for spray-freezing and drying of liquids containing up to 60 percent by weight of solids.

A further object of the invention is to provide means for avoiding the plugging referred to above.

The present invention thus provides a process for drying liquids which comprises spraying the liquid into a zone of subatmospheric pressure in a current of a gaseous fluid thereby to form frozen particles of said liquid and subsequently freeze-drying said frozen particles.

The present invention provides an apparatus suitable for carrying out the process described herein, comprising a freezing chamber, means for maintaining subatmospheric pressure within said chamber, means for spraying a liquid into said chamber simultaneously with a current of a gaseous fluid, means for evacuating and condensing vapors generated within said chamber and at least one freeze-drying chamber.

A preferred embodiment of the apparatus according to the present invention is shown in the accompanying drawings in which:

FIG. 1 is a schematic elevation, partly in section, of the freezing chamber with ancillary equipment;

FIG. 2 is a magnified sectional view of a spray nozzle.

As shown in FIG. 1 the apparatus comprises a vertical freezing chamber 1 of metal construction, with cylindrical walls and conical bottom. The dimensions of the chamber may, for example, be 3 meters in diameter and 10 meters in height.

At the upper end of the freezing chamber is mounted a spray system comprising a two fluid nozzle 2 and feedlines 3 and $3^a$ for supplying, respectively, the solution to be dried and the gaseous fluid which is preferably steam. At the bottom of the chamber is a hopper 4 if the chamber is directly connected to a freeze-drying chamber 25 or an airlock if the freeze-drying chamber is not directly connected. This chamber 25 may be of any desired type or construction, and in particular, it may be a continuous or batch unit, including the usual ancillary equipment such as condensers, heating platens, vacuum pumps and the like.

Ducts 6 connect the lower part of the chamber to condensers 5, disposed symmetrically. These may be 2, 4, or 6 in number, depending on their dimensions and those of the chamber. A valve 7 is mounted on each duct so that each condenser may be individually isolated for cleaning or defrosting without necessarily breaking the vacuum within the chamber.

The condensers 5 are also connected by ducts 8 to a vacuum system 9 comprising one or more pumps of adequate capacity to maintain an absolute pressure within the freezing chamber of 50–500 microns. When steam is used as the gaseous fluid, the pumping system need not be excessively large since the water vapor formed can be condensed out of the system and need not be pumped. A filter 10 is mounted on each duct 8 between the condenser and vacuum system to trap any fine particles which may have been sucked out of the chamber.

Freezing of the particles of liquid formed at the upper end of the chamber 1 should be rapid. When the liquid to be dried is a coffee extract containing 30 to 50 percent by weight of dissolved coffee solids, the particles should be frozen solid after a free-fall lasting about 0.5 to 1.5 seconds. Particles of a tea extract of similar concentration require about 0.5 to 1.0 seconds. Furthermore, in order to obtain an even dispersion of the liquid, that is, a uniform particle size, it is generally necessary to spray at a high pressure. This would lead to jet of high-velocity particles, directed downwardly and encountering no notable resistance during the fall. Under these conditions, the time of fall within a chamber of reasonable dimensions would be too short to ensure complete freezing of all particles.

According to the present invention, however, the liquid is sprayed at a relatively low pressure, and dispersion is obtained by the action of a current of gaseous fluid, preferably steam, which is sprayed from the same nozzle as the liquid. The fluid, for example steam, is sprayed in the form of an annular curtain surrounding the liquid jet, and the paths of the jets meet at a short distance from the nozzle, and the liquid jet is broken up into fine particles on impact with the jet of steam. The particles then have a sufficiently long path of fall within the chamber 1 to ensure their complete freezing.

FIG. 2 shows a preferred spray nozzle. It comprises an outer sleeve 11 which surrounds a central spray jet 12. The jet 12 is fed with solution through line 3 which is sprayed through orifice 13, for example at a pressure of 0.2 to 0.4 kg./cm.$^2$ in the form of a conical sheet. Steam, supplied to the nozzle by line $3^a$, passes through the annular space 14 between the sleeve 11 and the spray jet 12, for example at a pressure between 0.5 and 2.5 kg./cm.$^2$, and enters the chamber through the annular orifice 15. As shown in the drawing, the orifices 13 and 15 lie in the same horizontal plane.

According to a feature of the present invention, the annular curtain of gaseous fluid is injected into the chamber more or less vertically and thus it meets the conical sheet of liquid at a short distance below the nozzle, which prevents the liquid from spreading outwards in the direction of the sidewalls of the chamber. Furthermore, this particular arrangement of the steam and liquid jets prevents formation of frozen liquid deposits at the nozzle opening which would lead to an irregular particle size and ultimate plugging of the jet.

In order to ensure that no liquid particles stick to the inside walls of chamber 1, a permeable flexible member 19, for example of nylon net, may be disposed within the chamber. Such a lining may be shaken to dislodge any attached particles, and it also serves as a filter preventing particles from entering the ducts 6.

In operating the process, three factors have to be considered in order to determine optimum conditions of freezing, notably the absolute pressure within the chamber and the solids concentration and temperature of the solution being dried.

The absolute pressure within the chamber, measured in microns of mercury, should be maintained below the vapor pressure of the eutectic present in the solution which freezes at the lowest temperature. In general, the pressure will usually be below 500 microns, but may be lower in certain cases. Thus, for an aqueous solution containing 30 to 50 percent by weight of soluble solids of roasted coffee, the pressure is preferably maintained at about 100 to 150 microns of mercury. Under these conditions, the condenser temperature should desirably be maintained between −55° and −60° C.

It has further been observed that high-temperature spraying of aqueous solutions of low concentration of soluble coffee or tea solids leads to the production of low-density particles which, in turn, have a light color. It is consequently preferred to spray the liquid at temperatures of 50° to 60° C.

The density of the finished product may be adjusted by incorporating a small amount of a gas, such as nitrogen or carbon dioxide in the spray solution, but in general this is not necessary.

Sublimation of the frozen diluent present in the solution to be dried commences in the freezing chamber and the resulting vapors are evacuated from the chamber and condensed, together with those generated when the liquid boils on first encountering the low pressure within the chamber. Sublimation of the diluent is completed in a freeze-drying chamber. When the freeze-drying installation is directly connected to the freezing chamber, some of the ancillary equipment, notably condensers 5 and vacuum system 9 may be shared by both the freezing and the freeze-drying chambers.

The process and apparatus described herein are especially suitable for drying sensitive materials such as aromatic extracts, milk products, fruit juices, biological solutions and the like. The process and apparatus are especially suited for the drying of aqueous tea and coffee extracts containing 20 to 60 percent by weight of soluble solids.

The following examples are given for the purposes of illustration only:

EXAMPLE 1

An aqueous solution containing 45 percent by weight of soluble roasted coffee solids is preheated to a temperature of about 60° C. and sprayed through a two-fluid nozzle (Spraying Systems, No. 60,100) into a freezing chamber in which an absolute pressure of 100 microns of mercury is maintained. The nozzle is placed at 0.76 meters below the top of the chamber, which has a diameter of about 3 meters. The coffee solution is sprayed at a pressure of 0.35 kg./cm.$^2$ simultaneously with steam at a pressure of about 2.1 kg./cm.$^2$. Under these spraying conditions liquid particles or globules between about 50 and 300 microns in diameter are produced. These particles are frozen to a solid state by the time they arrive at the bottom of the freezing chamber from which they are removed through a suitable airlock. The frozen product is then distributed on trays and dried in a batch freeze-drying unit. The resulting dry coffee extract has attractive dark brown color and a density of 190 g./l.

EXAMPLE 2

A concentrated extract containing 65 percent by weight of soluble tea solids is diluted to a concentration of 43 percent by addition of an aromatic tea distillate. This solution is preheated to about 55° C. and sprayed through a two-fluid nozzle (Spraying Systems, No. 60,100) into a freezing chamber as described in example 1. The tea solution is sprayed at a pressure of 0.21 kg./cm.$^2$, simultaneously with steam at a pressure of 0.7 kg./cm.$^2$. The absolute pressure within the chamber is maintained at 180 microns of mercury.

A small quantity of gaseous carbon dioxide is incorporated in the liquid extract to adjust the density of the finished product. The particles produced by spraying are frozen solid when they reach the bottom of the chamber after a fall of some 10 meters. They are collected in a hopper and distributed automatically on the transporter of a continuously functioning freeze-drying unit which is directly connected to the freezing chamber. The diluent is sublimed and the product reaches the end of the transporter in the form of a freeze-dried tea extract containing around 3 percent by weight of moisture. It is removed through an airlock and packed in suitable containers. The product is slightly flaky in appearance and has an attractive color; on reconstitution with water, the product has a flavor and aroma which are superior to conventional spray-dried tea extracts.

EXAMPLE 3

A liquid potato soup mix containing 12.5 percent by weight of total solids is preheated to 33° C. and sprayed through a two-fluid nozzle of the suction type (Spraying Systems, No. 2850) into a freezing chamber in which an absolute pressure of 150 microns of mercury is maintained. The liquid mix is sprayed at a pressure of 7.7 kg./cm.$^2$ simultaneously with air at 2.1 kg./cm.$^2$. The nozzle is located at about 0.76 meters below the top of the chamber which is about 3 meters in diameter and 10 meters high. The frozen particles are removed from the chamber through an airlock and freeze-dried in a batch freeze-drying unit. The dried product has a density of 167 g./l. and a moisture content of 4.98 percent. On reconstitution with water it gives a pleasant-flavored potato soup.

We claim:

1. An apparatus for drying liquids comprising, in combination, an upright freezing chamber, means connected at the top of said chamber for spraying liquid and a current of gaseous fluid simultaneously and codirectionally downwardly into said freezing chamber, means for maintaining a condition of subatmospheric pressure within said freezing chamber whereby the liquid sprayed into said freezing chamber is evaporatively frozen and falls to the bottom of said freezing chamber, means for evacuating and condensing vapors generated within said freezing chamber, and at least one freeze-drying chamber connected with the bottom of said freezing chamber for receiving and freeze-drying the frozen liquid.

2. The apparatus according to claim 1 in which the means for simultaneously spraying the liquid and the gaseous fluid into said freezing chamber includes a two-fluid nozzle of the suction type, said nozzle having a central aperture therein for discharge of said liquid, and an annular orifice encircling said central aperture for discharge of said gaseous fluid.

3. The apparatus according to claim 2 in which the central opening and annular orifice in said nozzle are arranged such that the paths of discharge of said liquid and said gaseous fluid intersect at a short distance downstream of said nozzle.

4. The apparatus of claim 1 further comprising a flexible permeable membrane disposed within said freezing chamber and defining an inner lining therefor, said membrane being made flexible to be subjected to a shaking action for dislodging any particles of frozen liquid attaching thereto.

* * * * *

UNITED STATES PATENT OFFICE
CERTIFICATE OF CORRECTION

Patent No. 3,633,283                  Dated January 11, 1972

Inventor(s) Abraham Rudolph Mishkin; William Stephen Symbolik

It is certified that error appears in the above-identified patent and that said Letters Patent are hereby corrected as shown below:

Column 1, line 3 should read --28, 1968, which is in turn, a continuation-in-part of Application Serial No. 663,288, filed August 25, 1967, now abandoned.--.

Signed and sealed this 20th day of February 1973.

(SEAL)
Attest:

EDWARD M. FLETCHER, JR.
Attesting Officer

ROBERT GOTTSCHALK
Commissioner of Patents